Feb. 27, 1951     O. E. WOLFF     2,543,396
OVERLOAD RELEASE COUPLING

Filed March 1, 1946     3 Sheets-Sheet 1

INVENTOR
Otto E. Wolff
BY
Donald R. Brown
Attorney

Feb. 27, 1951          O. E. WOLFF          2,543,396
OVERLOAD RELEASE COUPLING
Filed March 1, 1946          3 Sheets-Sheet 2
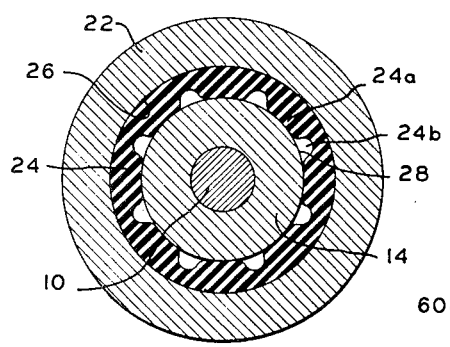
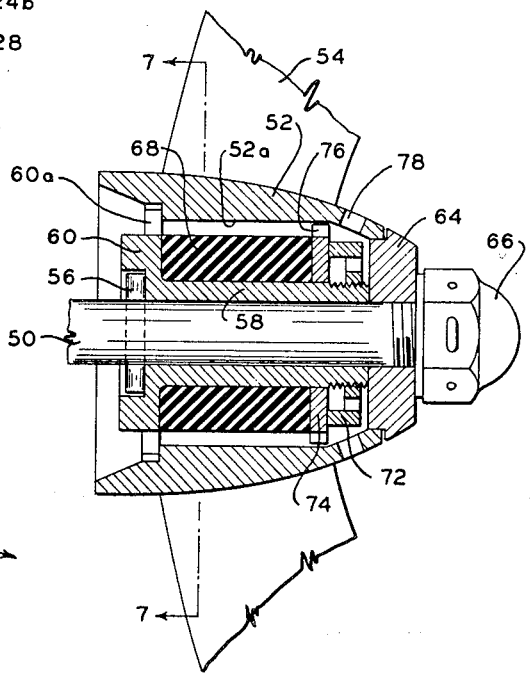
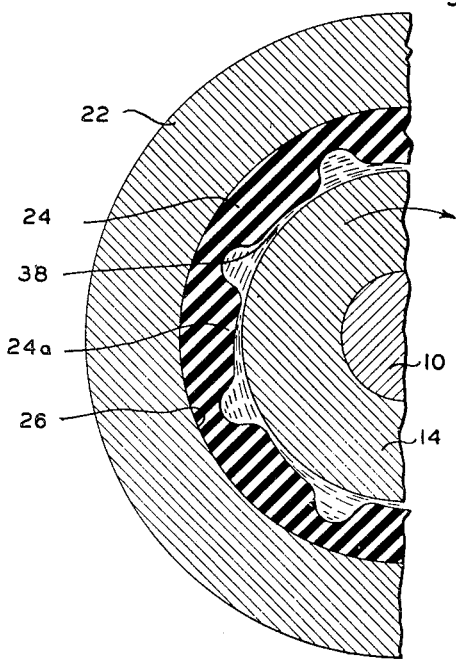
INVENTOR
Otto E. Wolff
BY
Donald R. Brown
Attorney Feb. 27, 1951  O. E. WOLFF  2,543,396
OVERLOAD RELEASE COUPLING
Filed March 1, 1946  3 Sheets-Sheet 3

INVENTOR
Otto E. Wolff
BY Donald C. Brown
Attorney

Patented Feb. 27, 1951

2,543,396

UNITED STATES PATENT OFFICE 2,543,396

OVERLOAD RELEASE COUPLING

Otto E. Wolff, Cambridge, Mass., assignor of one-fourth to Polaroid Corporation, Cambridge, Mass., a corporation of Delaware Application March 1, 1946, Serial No. 651,254

10 Claims. (Cl. 64—30)

This invention relates to torque-transmitting devices, and more particularly to novel and improved coupling means for operatively connecting rotary members.

It is one object of the present invention to provide a coupling for transmitting torques up to a predetermined torque, said coupling being of the type adapted to effect substantially complete and frictionless disengagement between the driving and driven member when said predetermined torque is exceeded.

Another object of the invention is to provide a safety coupling adapted to connect a driven member such, for example, as the propeller of a sea craft, to a driving member, such as the drive shaft of the power plant of said craft, in such manner that when the driven member is subjected to a resisting force or forces adapted to exceed a predetermined torque, as, for example, when the propeller is fouled, transmission of torque between the driving member and the driven member is substantially completely discontinued.

A further object is to provide a safety coupling of the above character wherein the disengagement of the driving member from the driven member is aided by the lubricating effect of the fluid in which the coupling is operating.

Still another object is to provide a coupling or clutch of the above character wherein re-engagement of the driven and driving members is automatically obtained, after removal of the torque in excess of the maximum torque which can be transmitted by said coupling, by bringing said members to the same rotational speed as, for example, by bringing both members to rest.

A still further object of the present invention is to provide a coupling for transmitting torques up to a predetermined torque, said coupling embodying novel, readily adjustable means for controlling the maximum transmittable torque.

Further objects are the provision of a novel clutch or coupling which tends to absorb and eliminate the transmission of shocks and vibrations and to smooth out power fluctuations between the interconnected members, which is simple, compact and reliable in operation and which can be readily and economically manufactured and assembled.

The invention accordingly comprises the features of the construction, combination of elements and arrangements of parts which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Fig. 3 is a sectional view taken substantially along line 3—3 of Fig. 1;

Fig. 4 is an enlarged sectional view corresponding to Fig. 3, with parts thereof somewhat exaggerated, showing the coupling in disengaged condition;

Fig. 5 is a view like Fig. 1 of a propeller drive embodying another form of the coupling means of the present invention;

Figure 1:
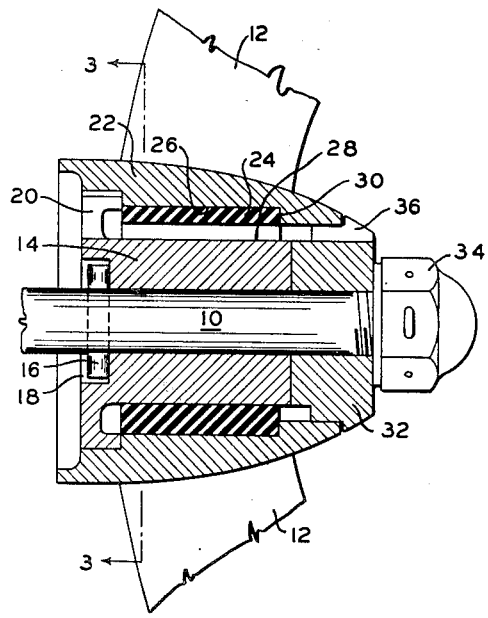
Figure 1 is a view, partly in section and partly in elevation, of a type of propeller drive embodying one form of the novel coupling of the present invention, the section being taken substantially along the axis of rotation of said coupling.
Figure 2:
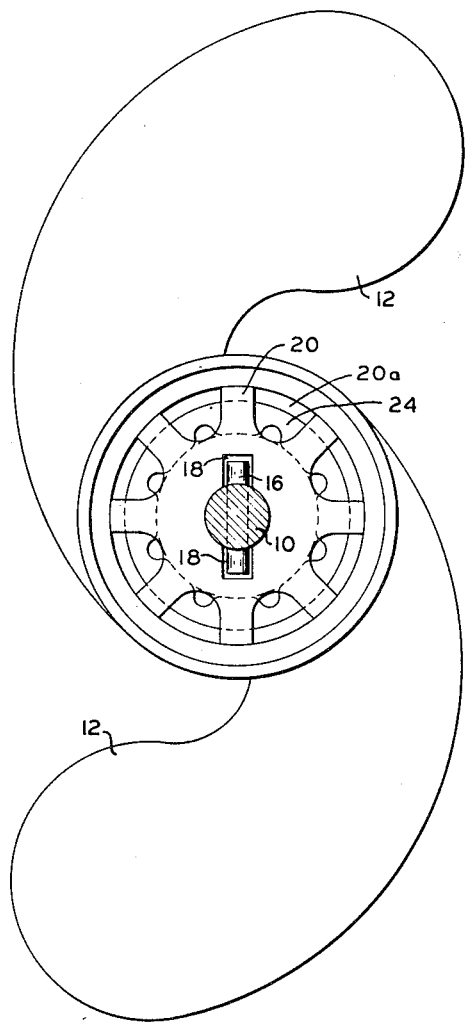
Fig. 2 is a front elevation view of the structure of Fig. 1, the shaft thereof being shown in section.

Referring to Figs. 1 through 4, the novel power-transmitting device of the present invention is illustrated by way of example as connecting the drive shaft 10 of a suitable sea craft to its propeller 12. The specific form of the coupling here illustrated is particularly adapted for utility in connecting the drive shaft of an outboard motor to its propeller. It is to be expressly understood, however, that the novel coupling of the invention is not limited to structures of this type and may be utilized in any fluid medium for connecting a driving and driven member so as to effect torque-transmittal therebetween.

In the form shown, the novel coupling comprises a sleeve 14 secured to drive shaft 10 by suitable means such, for example, as a key 16 (Figs. 1 and 2) which fits into diametrically extending rectangular recesses 18 provided on opposite sides of said shaft in the leading end of said sleeve, and which extends through shaft 10. The leading end of said sleeve is preferably provided with a plurality of radially-extending tabs or flange members 20. Said tabs are circumferentially spaced with respect to one another (Fig. 2), thereby providing openings 20a therebetween for the passage of fluid into the coupling.

To transmit torque from sleeve 14 to propeller hub 22, there is provided a molded rubber bushing 24, said bushing being preferably formed of a natural vulcanized rubber having a high abrasion resistance and preferably of the type which may be subjected to a substantial compression without taking on a permanent set. The hardness may, for example, be of the order of 40 to 50 durometer units, although it is not in any respect critical. While a natural vulcanized rubber having the above characteristics is preferred, it is equally possible to use synthetic products such as the buna rubbers, and particularly such synthetic rubbers as Buna N or neoprene. The term "rubber-like material" as used herein is to be expressly understood to be generic to that class of materials which possesses properties generally analogous to the properties of natural vulcanized rubber, i. e., a yieldable material adapted when subjected to compression along one axis in a confined space to apply pressure radially of said axis, in contradistinction to such relatively rigid materials, for example, as the metals, which will tend to transmit a compressive force applied thereto only in the direction of application thereof.

In one form of the invention, bushing 24 is rigidly secured to the internal peripheral surface 26 (Fig. 3) of hub 22 as, for example, by being vulcanized to said surface, and is adapted to frictionally engage the outer peripheral surface 28 of sleeve 14. Surface 28 is preferably smooth and continuous for reasons to appear hereinafter.

A shoulder 30 is preferably provided adjacent the trailing edge of hub 22 and is abutted by the rear end of bushing 24. A suitable retaining sleeve 32 engages the rear end of sleeve 14 and a nut member 34 threaded onto the end of shaft 10 is adapted, in cooperation with key 16, to fix the axial position of sleeves 32 and 14 with respect to shaft 10. Sleeve 32 engages the inner surface of hub 22 and serves, together with sleeve 14, to mount the propeller of hub 22 concentrically with respect to shaft 10. The hub-engaging portion of sleeve 32 is provided with a plurality of axially-extending passages 36 to the interior of the coupling.

Bushing 24 is preferably held under compression between hub 22 and sleeve 14 and in the normal operation of the coupling the compressive force between said bushing and sleeve 14 produces intimate rubber to metal contact and sufficient tangential friction to sustain torques up to a predetermined maximum operating torque without slipping.

In order to obtain substantially complete disengagement between the shaft and the propeller when the torque exceeds the maximum operating torque, bushing 24 is provided with a plurality of circumferentially spaced, axially extending shoes 24a, and which preferably are integrally formed with bushing 24 and which, because of their circumferential spacing, provide a plurality of axial passages 24b between said bushing and sleeve 14. As a result of this construction, the fluid in which the above-described propeller drive is normally immersed is free to flow through the forward end of the sleeve 14 through passages 24b of said bushing and out of the drive through passages 36 in sleeve 32.

When the maximum operative torque is exceeded, shoes 24a will slip on surface 28. When said shoes begin to slip relative to surface 28, the slipping action, because of the resilience of bushing 24, will cause the outer surfaces of the said shoes to tilt somewhat about an axis parallel to the axis of rotation of said shoes and produce a wedge effect between said surfaces and surface 28. When this wedge action takes place, a continuous film 38 of the fluid in which the coupling is operating is forced between said engaging surfaces, and in effect produces a complete separation of said surfaces, as is illustrated in somewhat exaggerated fashion in Fig. 4. Because the fluid acts as a lubricant, substantially no torque can be transmitted from the driving shaft to the propeller while this condition exists, which is as long as said shoes are rotating at a different angular velocity than surface 28. Re-engagement of the friction surfaces for the purpose of effecting a power transmission between sleeve 14 and hub 22 is not achieved until there is substantially no relative rotation between said members. Under normal operating conditions, in order to effect re-engagement between the friction surfaces so as to make possible further power transmission from the driving to the driven member, said members are brought to rest or the driven member is completely unloaded so that the drag of film 38 is sufficient to bring the latter member to the speed of the driving member. Accordingly, if in operation a torque exceeding the maximum torque is applied to propeller 12, as for example when the latter becomes fouled, said propeller is substantially completely disengaged from the driving shaft and does not become operatively engaged to said driving shaft unless completely unloaded or unless the driving shaft is brought to rest.

The advantage of the use of a coupling of the above type in a power transmission such, for example, as the propeller drive of a sea craft, where it is likely that the driven member will encounter obstacles which will apply an excessive resisting torque thereto, is now believed to be evident. It is possible by the use of the coupling herein described to avoid the need for such safety devices as a shear pin which are destroyed whenever excessive torques are encountered in order to prevent destruction of more vital parts.

Figure 6:
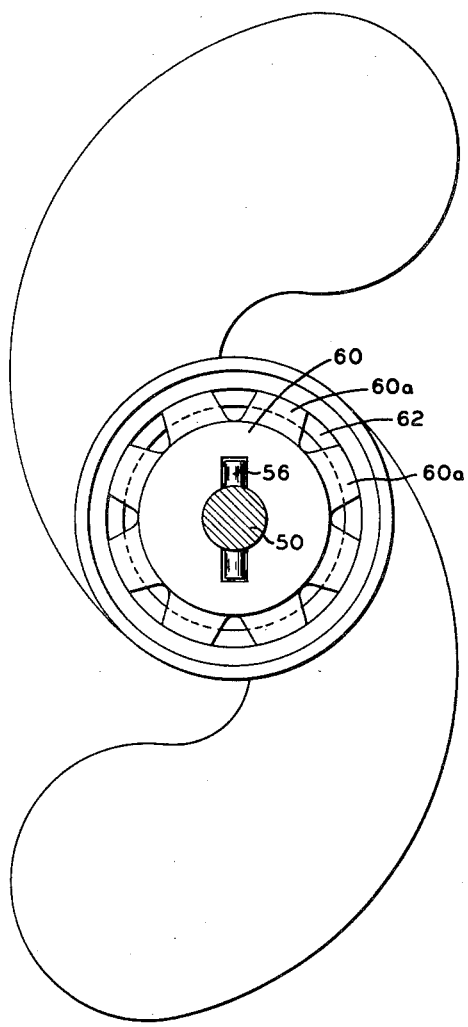
Fig. 6 is a front elevation view of the drive of Fig. 5, the drive shaft thereof being shown in section.
Figure 7:
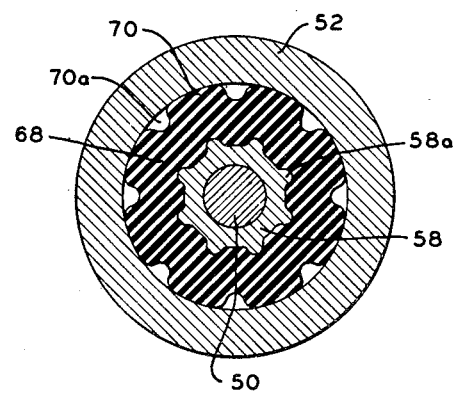
Fig. 7 is a sectional view taken substantially along line 7—7 of Fig. 5.

A modification of the above coupling wherein there is embodied means for mounting the flexible bushing so that the compression applied thereto may be varied in order to control the maximum transmittable torque, i. e., the maximum operative torque, is shown in Figs. 5 through 7. In the form illustrated, said coupling is adapted to connect a driving shaft 50 to a hub member 52 of a propeller 54, said driving shaft having a sleeve 58 secured thereto as by means of a key 56. A radial flange 60 is formed at the leading edge of said sleeve and is provided at its periphery with a plurality of tabs 60a (Fig. 6) which are circumferentially spaced to provide fluid passages 62 therebetween. The rear end of sleeve 58 abuts a washer member 64 which fits within the trailing end of propeller hub 52 and surrounds shaft 50. A nut member 66 is threaded on the end of shaft 50 and cooperates with key 56 to fix the axial position of sleeve 58 and said washer member, thereby also fixing the axial position of propeller 54 with respect to said shaft.

In this form of the invention, a yieldable bushing 68 of rubber-like material, similar to bushing 24 of the previously-described embodiment, is provided and is rigidly secured to the external periphery of sleeve 58 as, for example, by a plurality of splines 58a axially extending the length of at least that portion of said sleeve which engages said bushing. The bushing 68 is preferably molded with a plurality of axially extending internal recesses which are adapted to receive splines 58a when said bushing is operatively mounted on sleeve 58. This construction is effective, particularly when bushing 68 is under compression, to produce a positive connection between said bushing and sleeve 58.

To transmit torques up to a predetermined maximum torque and to make possible substantially complete disengagement between propeller 54 and shaft 50 when said torque is exceeded, the internal periphery of said bushing is provided with a plurality of shoes 70 (Fig. 3) which are preferably integrally formed therewith, but may be otherwise rigidly secured thereto, said shoes extending axially of said bushing and being circumferentially spaced with respect to one another. The construction provides a plurality of axial grooves or recesses 70a between shoes 70 for the passage of the fluid in which said coupling operates. Because of the yieldable nature of the material from which sleeve 58 is formed, the surfaces of shoes 70 are free to tilt with respect to the internal periphery 52a of hub 52 engaged by said shoe surfaces. When a torque in excess of the maximum operative torque is applied to propeller 54, hub 52 begins to slip with respect to bushing 68 and this causes the outer surfaces of shoes 70 to tilt with respect to surface 52a. This tilting of the shoe surfaces takes place about an axis substantially parallel to the axis of rotation of the shaft, being like the tilting of shoes 24a shown in Fig. 4. This tilting which attends relative motion causes a wedge-shaped water film to be established between surface 52a and the shoe surfaces, reducing the friction coefficient to the point where the bushing can spin freely within the hub. It is only when relative motion between hub and bushing ceases that re-engagement can take place, since only then is the separating water film squeezed out by the compressive force of the rubber, re-establishing high rubber to metal friction and again allowing full torque transmission.

In order to provide a means for controlling the maximum operative torque transmitted by the coupling, there is provided novel means for adjusting the axial compression of bushing 68. As shown, said means comprise a nut member 72 which is mounted on the end of sleeve 58, the latter being suitably threaded to receive said nut member. The forward end of bushing 68 abuts the inner face of flange 60 while the rear end of said bushing is engaged by a disk-like member 74. The latter is slidably mounted on sleeve 58 and is engaged by nut member 72. As a result, the adjustment of the axial position of the nut member effects a corresponding adjustment of the axial position of said disk-like member, permitting variation in the compressive force applied to bushing 68. This, in turn, controls the radial compressions of said bushing and the force with which shoes 70 thereof are pressed into engagement with surface 52a.

To permit the flow of the fluid in which said coupling is operated through said coupling, passages 62 in the leading edge of sleeve 58 cooperate with passages 70a in bushing 68 and there are provided additional passages 76 in disk-like member 74 and further passages 78 in the trailing edge of hub 52.

There is thus provided a novel clutch or coupling adapted to transmit torque between a driving and a driven member, and comprising as a torque-transmitting element thereof a member of yieldable rubber-like material. The coupling operates to transmit torques up to a predetermined maximum operative torque, and when said torque is exceeded the driven member slips with respect to the driving member, the slippage producing a substantially complete disengagement of said driven member from said driving member so far as the transmission of further torques is concerned. Only by bringing the members substantially to the same speed or to rest can re-engagement for the purpose of transmitting torques below the maximum operative torque be effected.

It is to be expressly understood that the invention is not limited to the specific embodiment illustrated by way of example in the drawings. For example, it is possible to rigidly secure the novel bushing 24 of the embodiment of Figs. 1 through 4 to hub 22 for positive rotation therewith by providing the internal periphery of said hub with a plurality of splines which coact with suitable grooves in the outer periphery of said bushing. Similarly, the bushing in the embodiment of Figs. 5 through 7 could be vulcanized to sleeve 58. It is likewise possible to modify the construction of Figs. 1 through 4 for the purpose of providing the coupling thereof with means for varying the compressive force to which bushing 24 is subjected during operation, thereby controlling the maximum operative torque of said coupling.

These and other modifications will now be apparent to those skilled in the art, and it is expressly understood that all such modifications are within the comprehension of the present invention.

Since certain changes in the constructions set forth which embody the invention may be made without departing from its scope, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a power transmission adapted to operate in a fluid, a driven member, a driving member, one of said members providing a smooth, continuous cylindrical, shoe-engaging surface, a yieldable element of rubber-like material secured to the other of said members for positive rotation therewith and adapted to transmit torque between said members, means connected to at least one of said members for holding said element under compression between said members, said element having secured thereto a plurality of circumferentially spaced, axially extending shoes formed of said rubber-like material, each said shoe frictionally engaging said shoe-engaging surface, the surface thereof normally in engagement with the shoe-engaging surface being adapted to tilt with respect to said shoe-engaging surface about an axis perpendicular to the direction of rotation of said members whenever there is relative rotation between said shoe and said shoe-engaging surface, and housing means connected to at least one of said members for containing said members and said element, said housing means being adapted to admit said fluid into said power transmission whereby, upon relative rotation of each said shoe and said shoe-engaging surface, continuous films of said fluid are introduced and maintained between the normally engaging surfaces of said shoe and said shoe-engaging surface.

2. In a power transmission adapted to operate in a fluid, a driven member, a driving member, one of said members providing a smooth, continuous shoe-engaging surface, circular in cross section, a yieldable element of rubber-like material secured to the other of said members for positive rotation therewith and adapted to transmit torque between said members, means connected to at least one of said members for holding said element under compression between said members, said element having integrally formed therewith a plurality of circumferentially spaced, axially extending shoes of said rubber-like material, each said shoe frictionally engaging said shoe-engaging surface, the surface thereof normally in engagement with the shoe-engaging surface being adapted to tilt with respect to said shoe-engaging surface about an axis perpendicular to the direction of rotation of said members whenever there is relative rotation between said shoes and said shoe-engaging surface, and housing means connected to at least one of said members for containing said members and said element and adapted to admit said fluid into said power transmission whereby, upon relative rotation of each said shoe and said shoe-engaging surface, continuous films of said fluid are introduced and maintained between the normally engaging surfaces of said shoe and said shoe-engaging surface.

3. In a power transmission of the type adapted to transmit torques up to a maximum operative torque and to slip when said maximum operative torque is exceeded, a driving member, a driven member, means for mounting said members so that the same are concentrically disposed with respect to one another, one of said members providing a smooth, continuous shoe-engaging surface concentric to and radially spaced with respect to the surface of the other of said members, a yieldable element of rubber-like material rigidly secured to said surface of the other of said members and adapted to transmit torque between said members, means connected to at least one of said members for holding said element under compression between said members, said element having rigidly secured thereto a plurality of shoes formed of said rubber-like material, each said shoe frictionally engaging said shoe-engaging surface, and mechanism carried by one of said members and connected to said means for holding said element under compression, said mechanism being operative to vary the compression of said yieldable element to vary the maximum operative torque of said transmission, said shoes being circumferentially spaced around the axis of rotation of said members.

4. In a power transmission of the type adapted to transmit torques up to a maximum operative torque and to slip when said maximum operative torque is exceeded, a driving member, a driven member, said members being concentrically disposed with respect to one another and one of said members providing a smooth, continuous shoe-engaging surface radially spaced with respect to the surface of the other of said members, a yieldable element of rubber-like material rigidly secured to said surface of the other of said members and adapted to transmit torque between said members, said element being held under compression between said members and having secured thereto a plurality of shoes formed of said rubber-like material, each said shoe frictionally engaging said shoe-engaging surface, and means engaging the end portions of said element for varying the compression applied to said element to vary the maximum operative torque of said transmission, said means comprising a member movable axially with respect to the axis of rotation of said driving and driven members.

5. The power transmission of claim 4 wherein the element of yieldable rubberlike material is mounted within the member providing the smooth continuous shoe-engaging surface.

6. The power transmission of claim 5 wherein the shoes are integrally secured to the yieldable element.

7. The power transmission of claim 4 wherein the member providing a smooth continuous shoe-engaging surface is concentrically mounted within the yieldable element of rubberlike material.

8. The power transmission of claim 7 wherein the shoes are integrally secured to the yieldable element.

9. The power transmission of claim 1 wherein the element of yieldable rubberlike material is mounted within the member providing the smooth continuous shoe engaging surface.

10. The power transmission of claim 1 wherein the member providing a smooth continuous shoe-engaging surface is concentrically mounted within the yieldable element of rubberlike material.

OTTO E. WOLFF.

REFERENCES CITED

The following references are of record in the file of this patent:

UNITED STATES PATENTS

| Number | Name | Date |
|---|---|---|
| 2,125,270 | Conover | Aug. 2, 1938 |
| 2,193,481 | Fawick | Mar. 12, 1940 |
| 2,447,384 | Wolff | Aug. 17, 1948 |